No. 819,899. PATENTED MAY 8, 1906.
H. E. MANN.
PLANT FOR DRAWING, QUENCHING, AND CONVEYING COKE.
APPLICATION FILED OCT. 6, 1905.
2 SHEETS—SHEET 2.
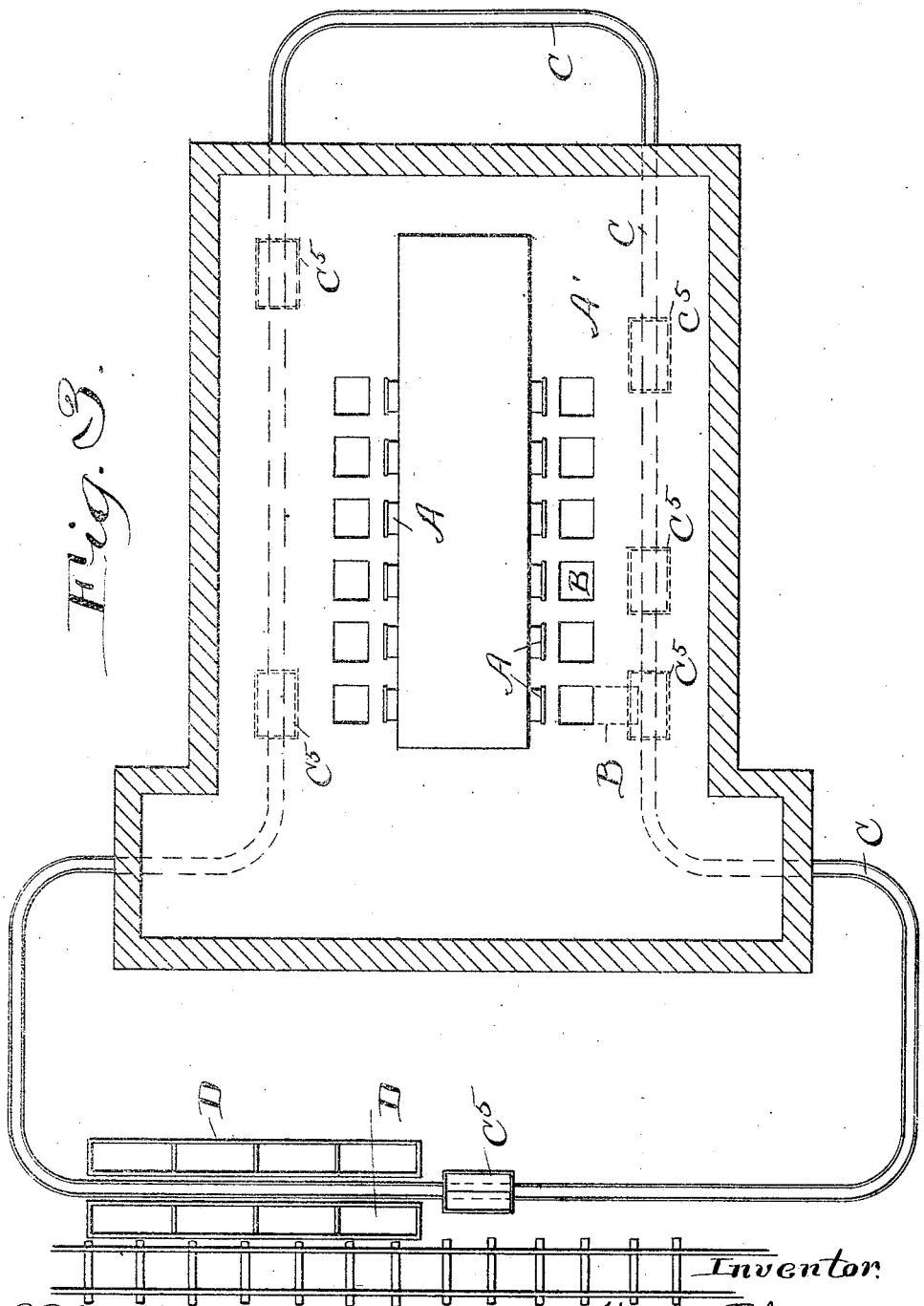

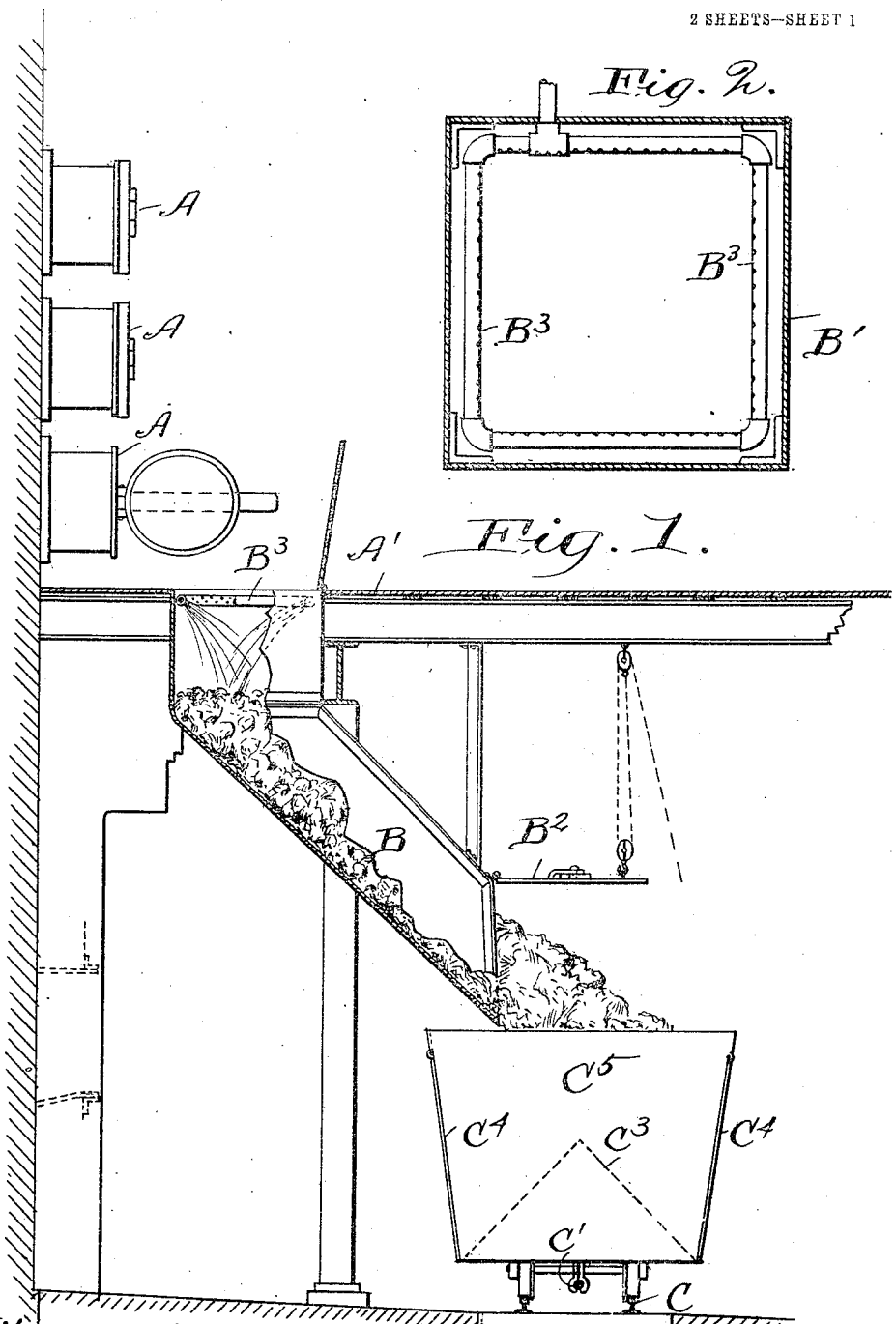

UNITED STATES PATENT OFFICE.

HOWARD E. MANN, OF CLEVELAND, OHIO.

PLANT FOR DRAWING, QUENCHING, AND CONVEYING COKE.

No. 819,899.  Specification of Letters Patent.  Patented May 8, 1906.

Application filed October 6, 1905. Serial No. 281,583.

*To all whom it may concern:*

Be it known that I, HOWARD E. MANN, a citizen of the United States, residing at Cleveland, in the county of Cuyahoga and State of Ohio, have invented a certain new and useful Improvement in Plants for Drawing, Quenching, and Conveying Coke, of which the following is a full, clear, and exact description, reference being had to the accompanying drawings.

The object of the present invention is to so arrange and equip coke-ovens or gas-retorts that the coke may be drawn and handled in a manner which shall secure the most uniform results and insure the delivery of the coke to the screens in suitable condition.

Another object sought by me is to so arrange and order the apparatus for and method of handling the coke between the ovens and the screens that the present expensive wear and tear on the apparatus employed shall be avoided, and this be accomplished without any large expense in the matter of new installation.

These and other objects will appear from the detailed description of the plant and method employed, as set forth in the succeeding portion of the specification.

Referring to the accompanying drawings, Figure 1 represents an end elevation, partly in section and partly broken away, showing the end of a retort-bench with a conveying system therebeneath and an intermediate quenching and retaining chute. Fig. 2 is a cross-section of the top of the quenching and retaining chute, taken just above the spray-pipe in Fig. 1. Fig. 3 is a plan indicating the general arrangement of the plant.

As will be seen by reference to Figs. 1 and 3, I have provided beneath each vertical series of retorts A A A and close to the furnace-wall a sheet-metal receiving-chute B, with its mouth B' approximately flush with the floor A' of the retort-room. The chute is provided at its lower end with a retaining-door $B^2$, provided with any suitable simple form of opening and fastening means. The form of chute shown is that best adapted for a plant in which the conveying system cannot be placed close to the retort-bench; but it is found that a straight or vertical chute is also quite satisfactory when the structure of the plant permits of the conveying system being brought in sufficiently close to the furnace to use this latter form of chute. In the top of the chute around the entrance I have provided spraying devices $B^3$ $B^3$, consisting of either a single continuous perforated pipe of the form shown or some other convenient and similar structure. As above pointed out and as will be seen by reference to Figs. 1 and 3, the chutes are of such dimension and so arranged that one is located beneath each vertical series of retorts, and, as shown in Figs. 1 and 2 of the drawings, each chute is from three to four times as long as it is wide. From these facts it is evident that the charge of coke drawn from each vertical series will be confined in a vertical column in such manner that when the water is sprayed into the upper end of the chutes and passes to the lower end thereof the cloud of steam generated by the contact of the hot coke therewith will rise through the entire mass of coke in the column. Beneath the delivery ends of the series of chutes and encircling the ovens I provide an endless railway C, preferably operated by cable C': The style of car which I use in the conveying system is one provided with a centrally-ridged floor $C^3$ and swinging gates $C^4$ on the sides. These cars $C^5$ $C^5$ are in my system capable of being constructed with wooden bodies, a fact which reduces the expense of installation to about one-sixth of that which it would cost otherwise.

I so arrange the plant that the cars may be run under the several chutes and receive the quenched coke as soon as it is cool and dry enough for the screens. The plant is so operated that each chute is freed from its burden before the retorts which feed it are ready for a second discharge. The cars travel from the retort-house through the yard and over screens D, where the coke is dumped, and thence along the endless track into the retort-house, traveling in the same direction as before.

In the operation of a plant arranged as that described the coke is drawn from the retorts and allowed to fall onto the floor of the retort-house, whence it can be easily shoveled into the receiving-chutes. Before the coke is charged into the chute the door $B^2$ at the lower end thereof is closed and secured and the spray $B^3$ at the upper end is turned on. As the white hot coke falls past the spray it is saturated with water and falls to the lower end of the chute and is retained therein, the water meanwhile being continually sprayed thereon, quenching the entire mass and wetting the metal walls of the chute. Clouds of steam are generated by this action which pass up through the coke column, serving to further quench and cool the upper layers of the charge. The quenching and cooling effect of these clouds of steam is of prime importance, since, owing to the long narrow structure of chute employed by me, the coke is confined to a column through which the clouds of steam are forced to pass, thus effecting a quenching which it is imposible to obtain in the troughs heretofore employed where the coke is allowed to fall out into a thin shallow layer. In this old form of quenching-trough the steam arising from the coke immediately passes into the open space above and is drawn off by the suction apparatus usually connected therewith, and thus is not utilized as a cooling-current for effectively and thoroughly quenching the coke, as is done in the applicant's apparatus. The only way in which coke spread out in thin shallow layers can be effectively quenched so as to be sufficiently cool to be drawn into wooden cars is by "drowning" the same with water, which renders it unfit for screening. Owing to the fact that the walls of the chute are kept wet from the beginning and the fact that the coke is sprayed by the water before it strikes the walls, it has been found that practically no corroding action takes place and the walls do not become heated. When the chute is filled, the water spray is turned off and the charge allowed to remain therein until properly cooled and dried, which in most cases occurs within two hours. Such water as is not evaporated by the heat of the coke and converted into steam trickles out of the lower end of the chute, owing to the fact that the door is not absolutely water-tight, and drains away from the coke, leaving it in sufficiently dry condition to be screened. When this condition has been reached, the door of the chute is opened and the coke allowed to fall into the wooden cars on the cable-road therebeneath. Each car is preferably of a size adapted to hold the charge drawn from at least one bench of retorts. The dried coke is thereupon conveyed out of the retort-house to the screens, where it is dumped by releasing the side walls of the cars after the manner well known, whereupon the car is returned to the retort-house to take its turn in the routine.

Heretofore the white hot coke has been drawn from the ovens and dumped directly into buggies, which were of necessity of metal, since no combustible or even semicombustible material could possibly withstand the wear or the heat. The metal buggies themselves have, however, not been able to withstand corrosion and become worn out in a remarkably short while. This corrosion is further increased by the fact that the practice has been to quench the coke in the open buggies themselves, usually by means of a hose operated by the workman, which practice is attended by considerable oxidation. It is practically impossible for the workman ordinarily to quench the coke in any manner which would prevent the corrosion and pitting of the buggies and at the same time leave the coke in any condition fit to be delivered to the screens. By the system which I have devised not only is the coke delivered to the conveying system cooled to such an extent that metallic buckets will not be pitted and corroded, but so cooled that wooden conveyers may be employed and a cheap form of cable dump-car installed, which installation would be an impossibility, both with regard to operation and deterioration, under the old system. Furthermore, by my system the coke is retained in such a manner that it is drained and dried to the exact condition suitable for screening before it is delivered to the sceens, an achievement not hitherto possible.

A very marked advantage of my arrangement is the elimination of the drippings of tar and the clouds of steam from the loading and conveying room. These two factors have hitherto made it difficult to secure workmen willing to perform the work of loading the buggies and quenching the coke therein. In a plant equipped according to my system there are no drippings permitted to fall upon the floor, and the steam generated on the quenching of the coke passes up within the confines of the chute and out through a perforated door at the top. On account of the proximity of the mouths of the chute to the hot retorts the steam rises vertically along the walls of the benches and is caught by the draft leading to the ventilators above, thus passing out of the room without inconvenience to any of the workmen. Further, it has been found that coke drawn, quenched, and handled in the manner described is very hard and almost white, being much less friable than the ordinary coke, and therefore more desirable for commercial reasons.

As pointed out above, the arrangement of plant is equally applicable to gas-retorts or coke-retorts, it being immaterial whether the sole product is coke or not so long as the coke drawn from the retorts is handled in the manner described.

Having thus described my invention, I claim—

1. A plant comprising a series of coke or gas retorts, a series of chutes under said retorts, means for supplying water so that it may pass to the bottom of said chutes, said chutes being adapted to receive the charge of coke drawn from the adjacent series of retorts and being of such size and proportion as to hold the coke in a column and to confine the steam generated from water passing to the bottom thereof to cause it to rise through the column of coke.

2. A plant comprising a series of coke or gas retorts, a series of chutes under said retorts, means for supplying water to said chutes so that it may pass to the bottom thereof, said chutes being adapted to hold the coke charge from the adjacent series of retorts in a column and to confine the steam generated from the water passing to the bottom thereof to cause it to rise through the column of coke, and a closure for the lower end of the chutes adapted to permit a slow drain of water therefrom.

3. A plant comprising a series of coke or gas retorts, a series of chutes beneath said series of retorts, each chute being adapted to receive the charge of coke drawn from the adjacent retort and having a long narrow body with an angular inclination below the mouth, and a water-supply at the mouth adapted to spray water into the interior of the retort.

4. A plant comprising a series of coke or gas retorts, a series of chutes beneath said series of retorts, water-supplying means for said chutes, a screen, a conveying system beneath said chutes and alongside the screen, each of said chutes being constructed to hold the charge of coke from the adjacent retorts in a long column and to permit water to pass from said water-supply to the bottom of the chute and to confine the steam generated therefrom so as to rise through the column of coke.

In testimony whereof I hereunto affix my signature in the presence of two witnesses.

HOWARD E. MANN.

Witnesses:
J. M. WOODWARD,
H. R. SULLIVAN.